(12) United States Patent
Lee et al.

(10) Patent No.: US 11,891,787 B2
(45) Date of Patent: Feb. 6, 2024

(54) AUTOMATIC FLUSHING DEVICE FOR ELECTRONIC BIDET HAVING AUTOMATIC FLUSHING FUNCTION FOR BOTH WATER TANK AND DIRECT FLUSH VALVE TOILET

(71) Applicant: AIR VOOM INC., Seoul (KR)

(72) Inventors: Dong Jin Lee, Seoul (KR); Jae Tong Lee, Seoul (KR)

(73) Assignee: AIR VOOM INC., Seoul (KR)

( * ) Notice: Subject to any disclaimer, the term of this patent is extended or adjusted under 35 U.S.C. 154(b) by 0 days.

(21) Appl. No.: 17/791,886

(22) PCT Filed: Jan. 6, 2021

(86) PCT No.: PCT/KR2021/000097
§ 371 (c)(1),
(2) Date: Jul. 8, 2022

(87) PCT Pub. No.: WO2021/141366
PCT Pub. Date: Jul. 15, 2021

(65) Prior Publication Data
US 2023/0030631 A1    Feb. 2, 2023

(30) Foreign Application Priority Data

Jan. 10, 2020 (KR) .......................... 10-2020-0003667

(51) Int. Cl.
*E03D 5/10* (2006.01)
*E03D 9/08* (2006.01)

(52) U.S. Cl.
CPC .................................... *E03D 5/10* (2013.01);
*E03D 9/08* (2013.01)

(58) Field of Classification Search
CPC .... E03D 5/10; E03D 9/08; E03D 1/34; E03D 1/38; E03D 3/00; E03D 5/02; E03D 5/105; Y02A 20/40; F16K 31/04; F16K 47/02
See application file for complete search history.

(56) References Cited

U.S. PATENT DOCUMENTS

| 2007/0079432 A1* | 4/2007 | Shoikhet ................... E03D 5/10 4/406 |
| 2015/0000026 A1* | 1/2015 | Clements ............ G06F 3/04886 4/443 |

FOREIGN PATENT DOCUMENTS

| KR | 10-0735881 B1 | 7/2007 |
| KR | 10-2012-0084477 A | 7/2012 |
| KR | 10-1190258 B1 | 10/2012 |

* cited by examiner

*Primary Examiner* — Christine J Skubinna
(74) *Attorney, Agent, or Firm* — Goldilocks Zone IP LAW

(57) ABSTRACT

Proposed is an automatic flushing device for an electronic bidet, in which the automatic flushing device has an automatic flushing function and is for both a water tank toilet and a direct flush valve toilet. In contrast to existing bidets, which are produced separately for the water tank toilet and the direct flush valve toilet in order to enable the automatic flushing function of the water tank toilet and the direct flush valve toilet, the automatic flushing device for the electronic bidet enables a single bidet to be capable of being used in both the water tank toilet and the direct flush valve toilet.

6 Claims, 16 Drawing Sheets

[FIG.1]
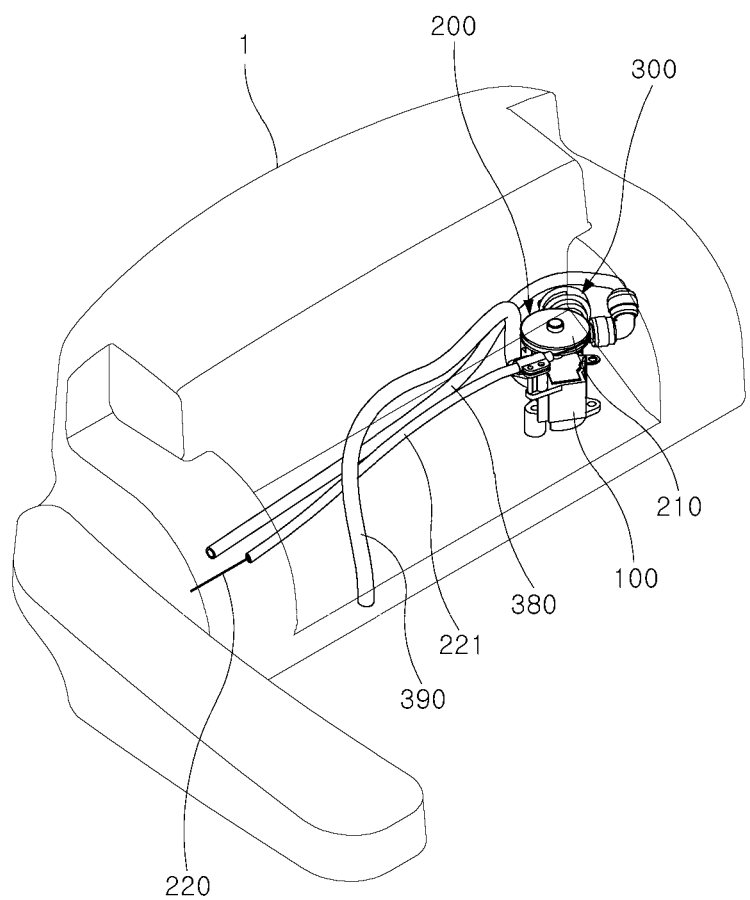

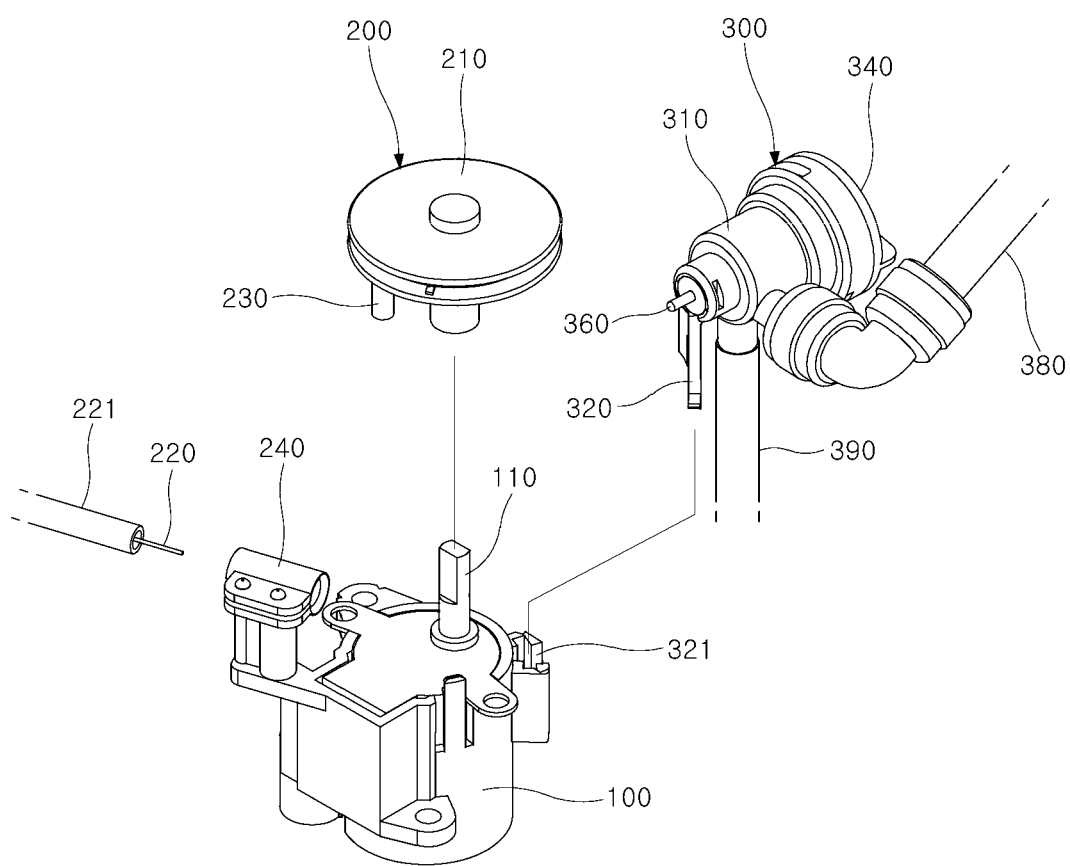
[FIG.2]

[FIG.3]
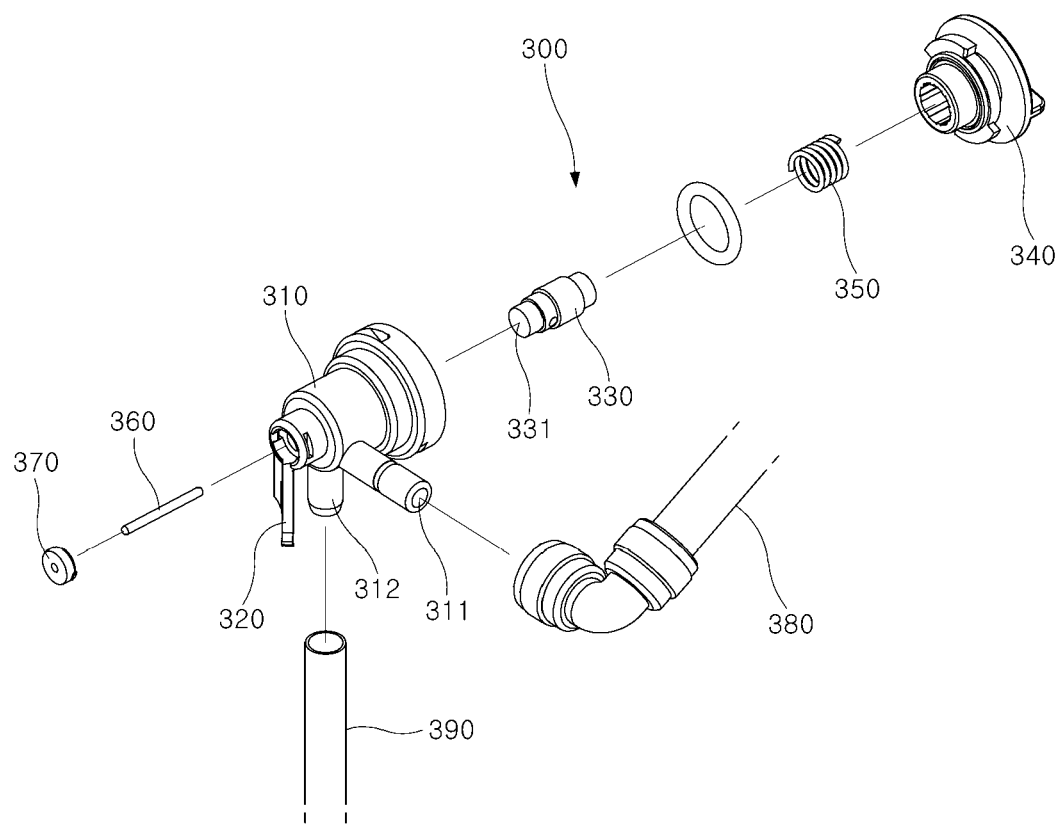

[FIG.4]
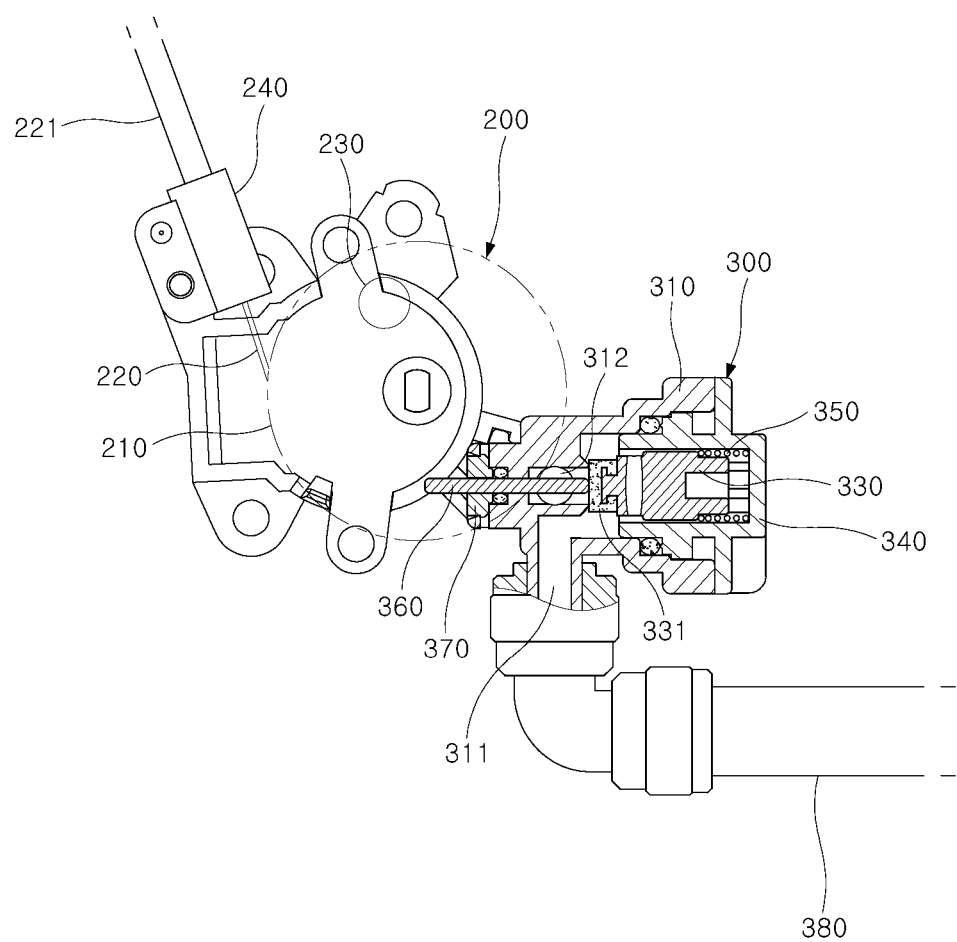

[FIG.5]
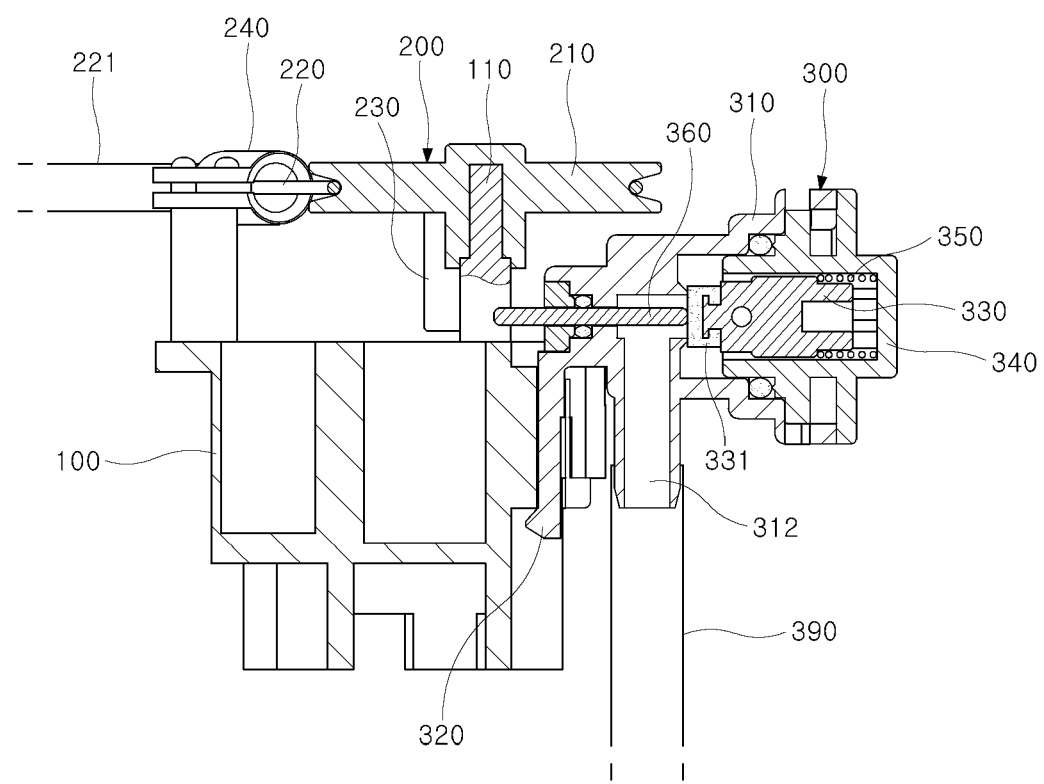

[FIG.6]
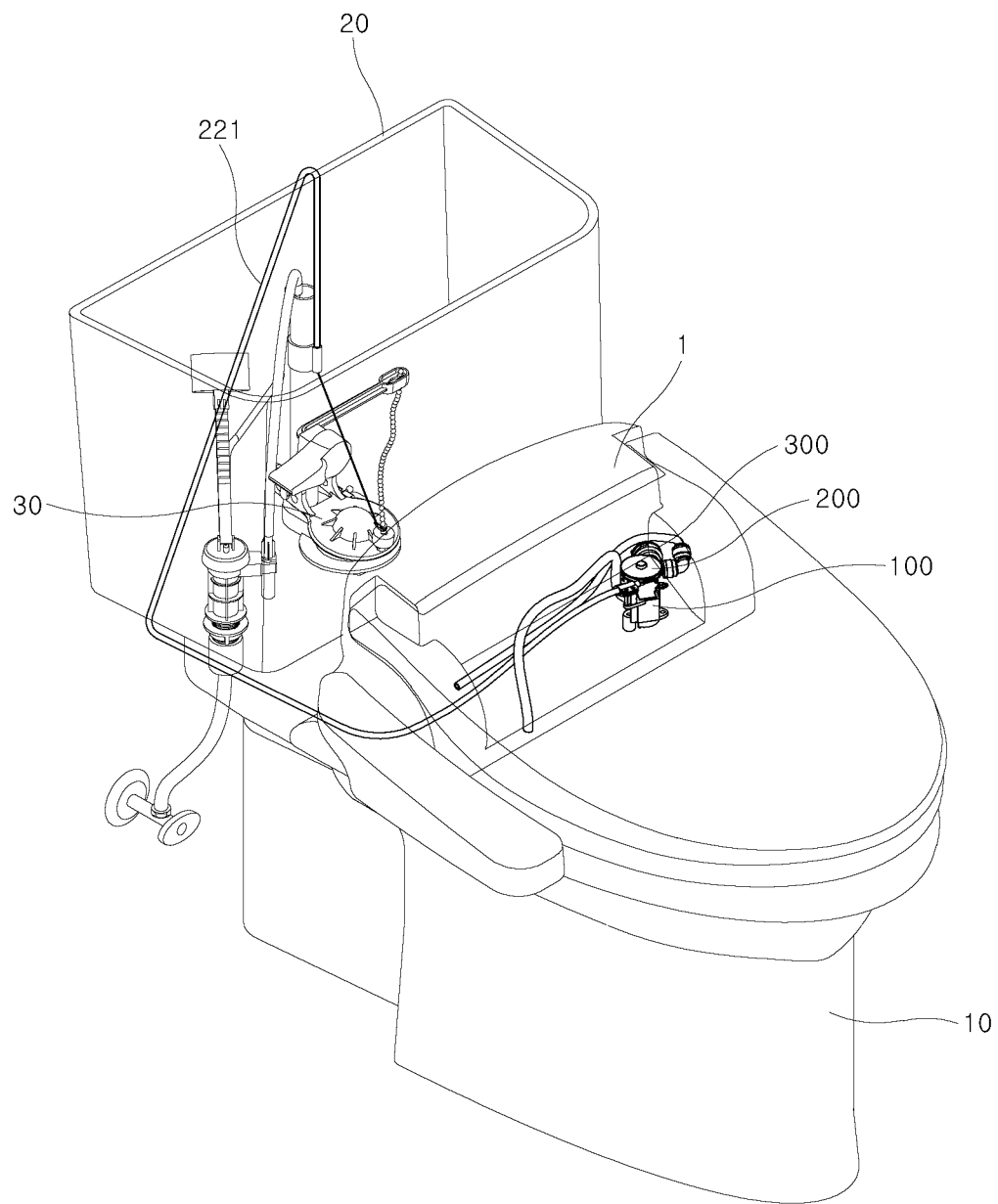

[FIG.7]
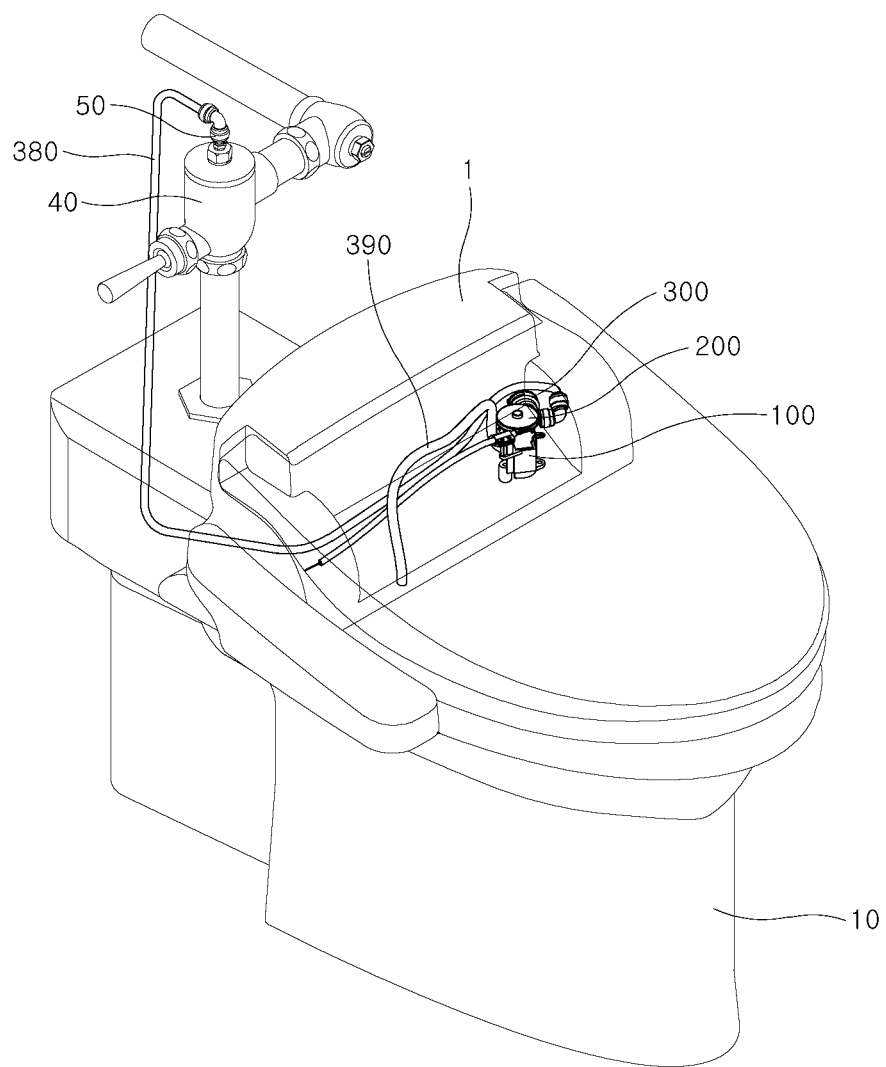

[FIG.8]
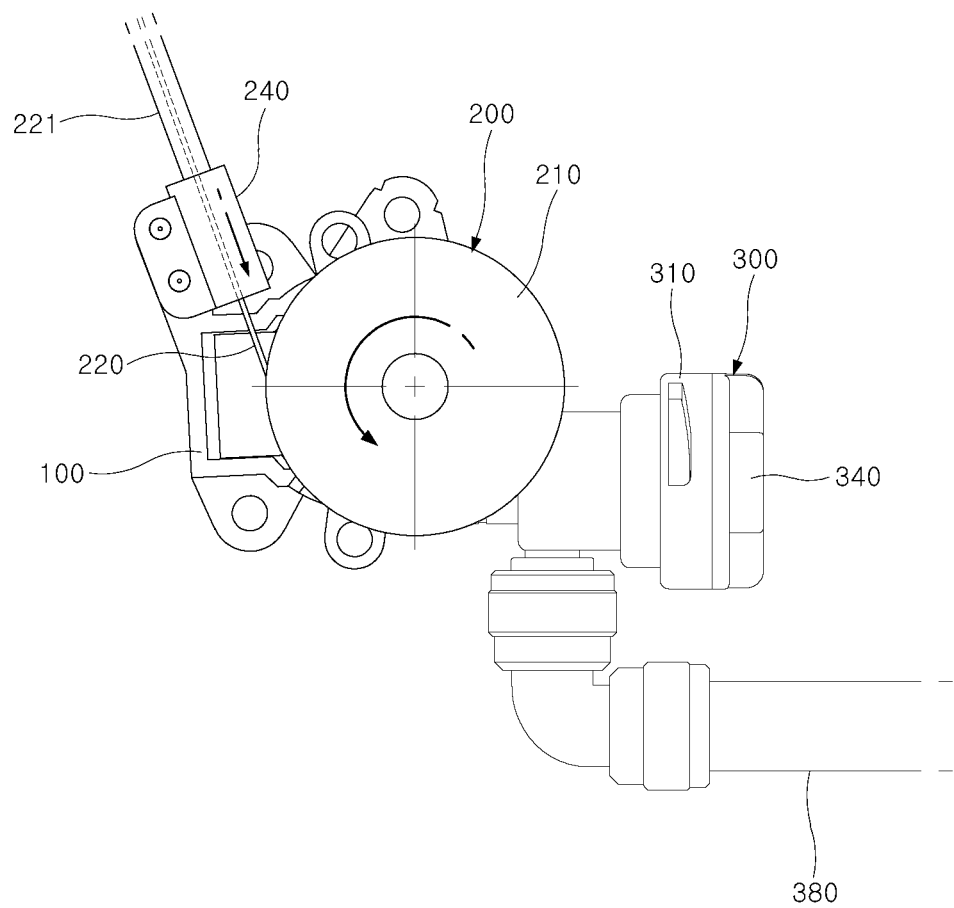

[FIG.9]
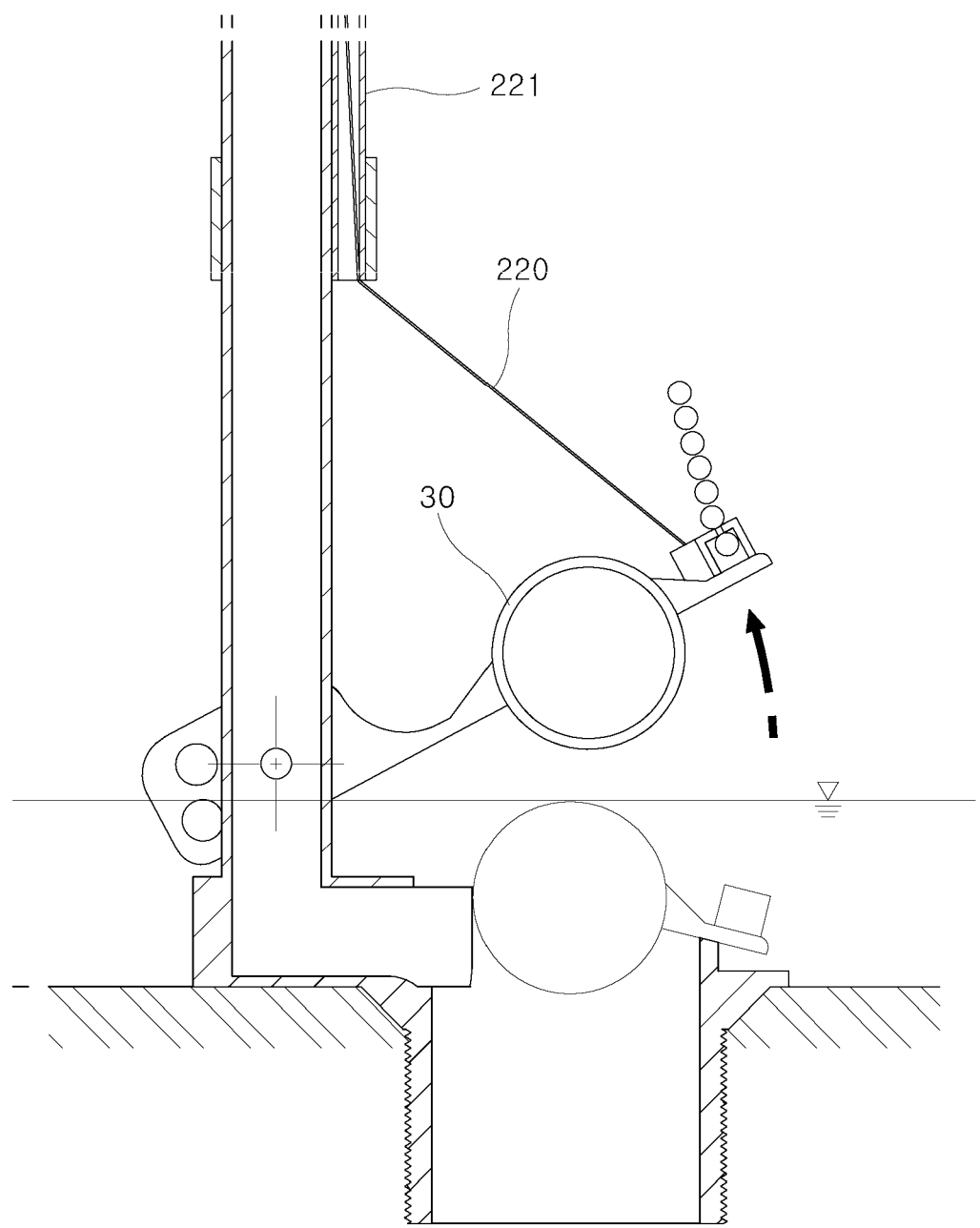

[FIG. 10]
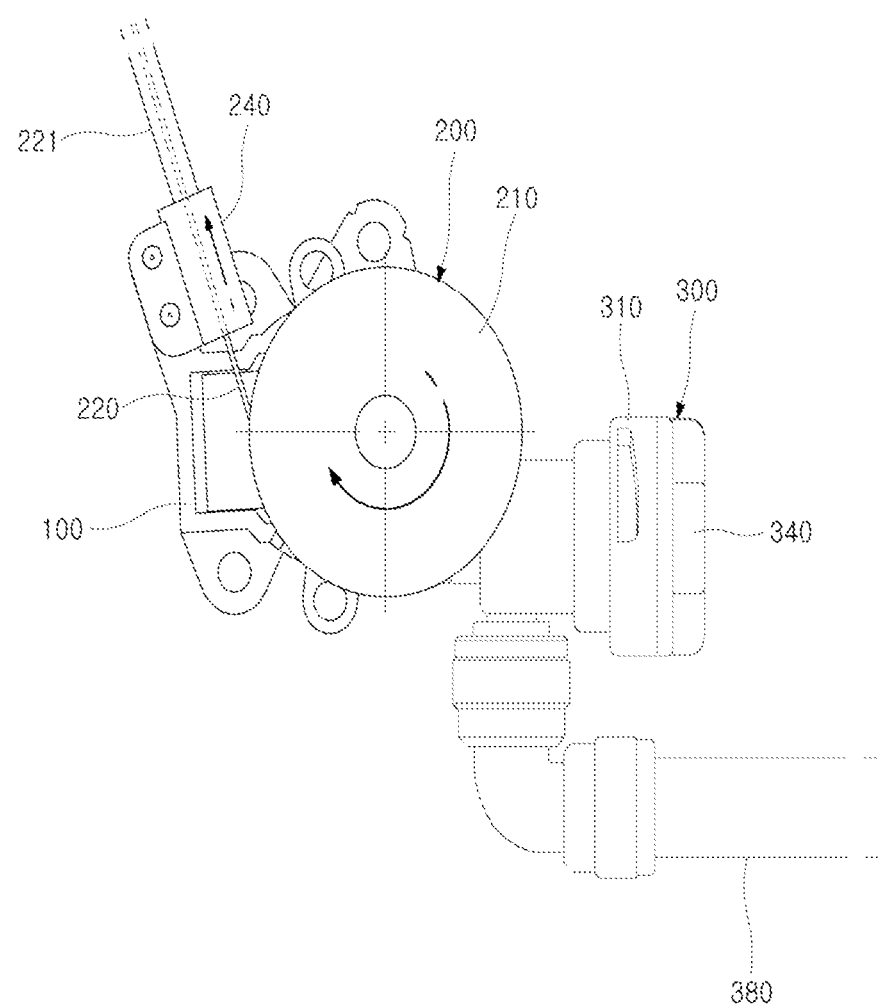

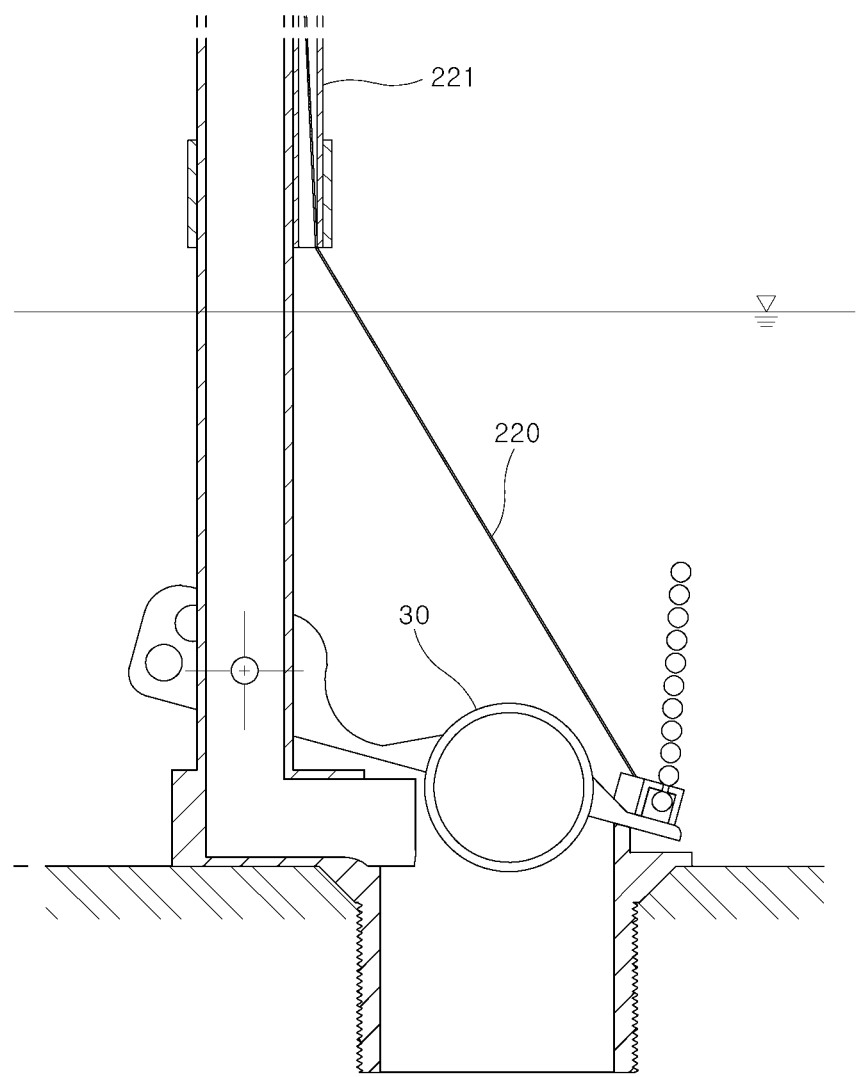
[FIG.11]

[FIG.12]
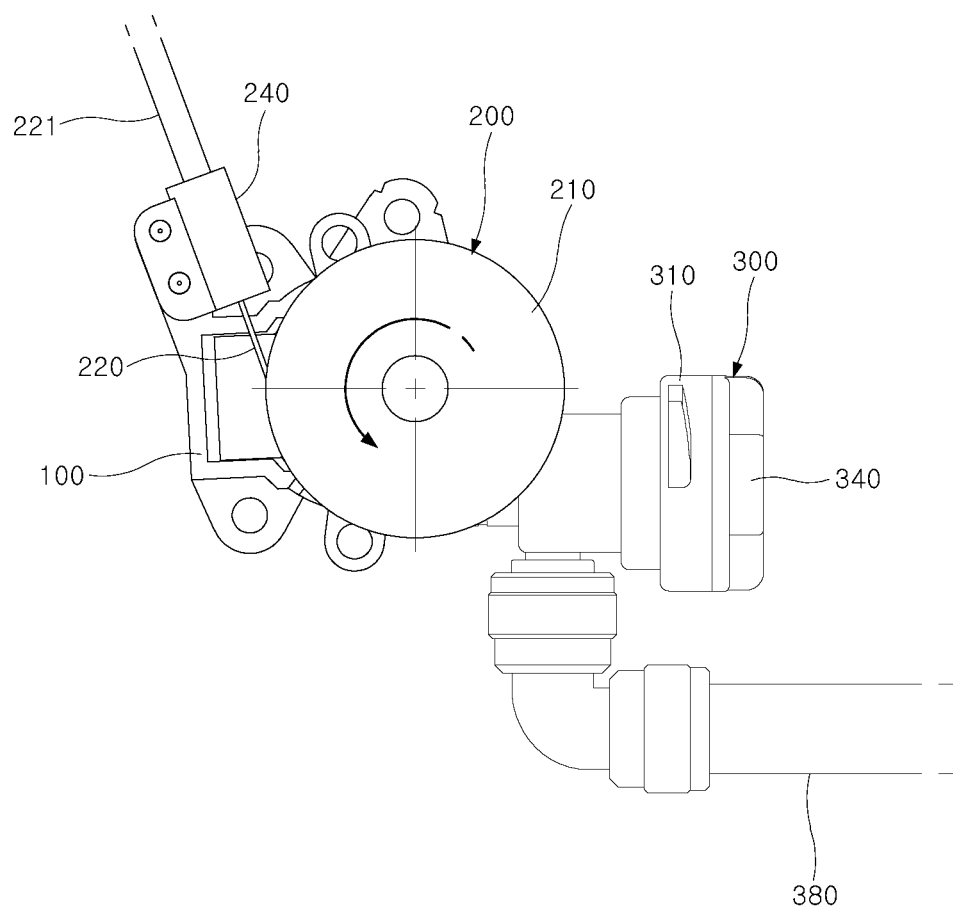

[FIG.13]
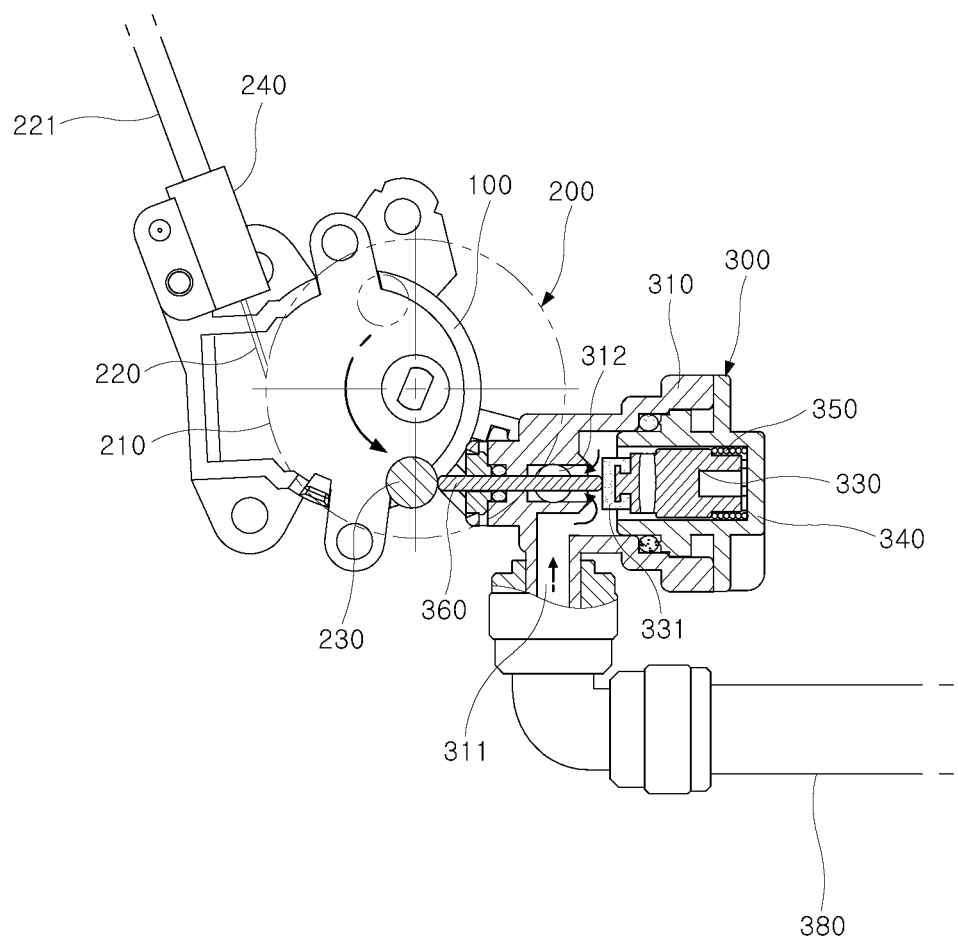

[FIG.14]
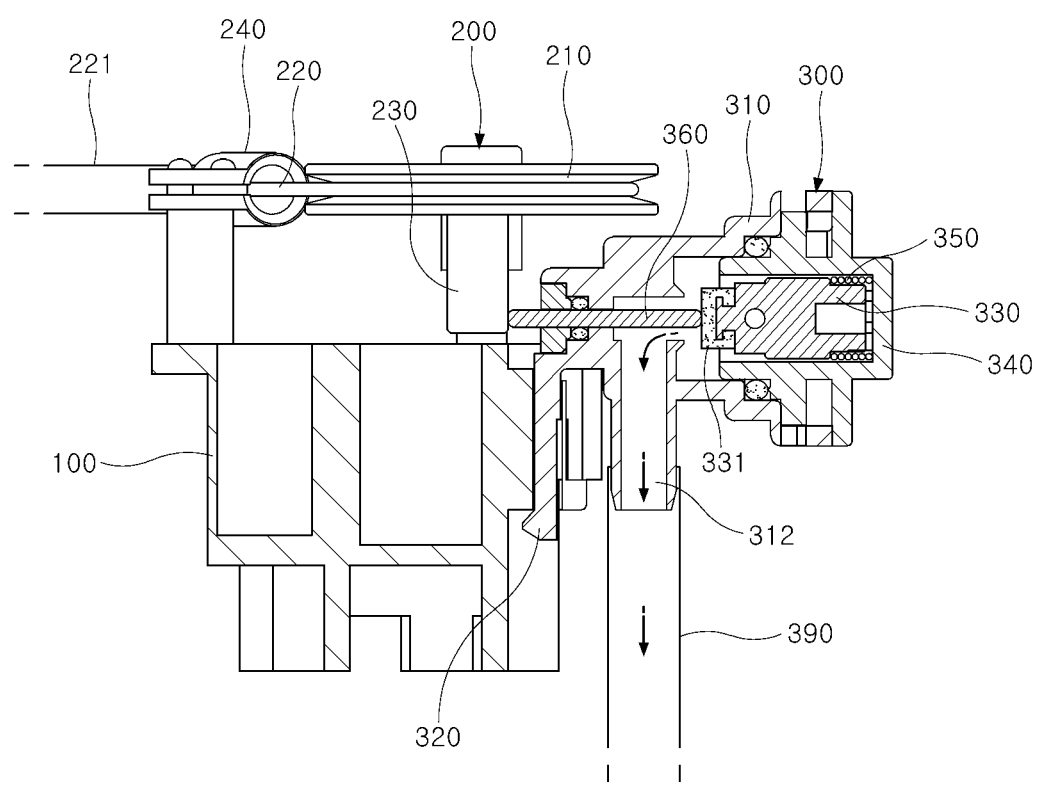

[FIG.15]
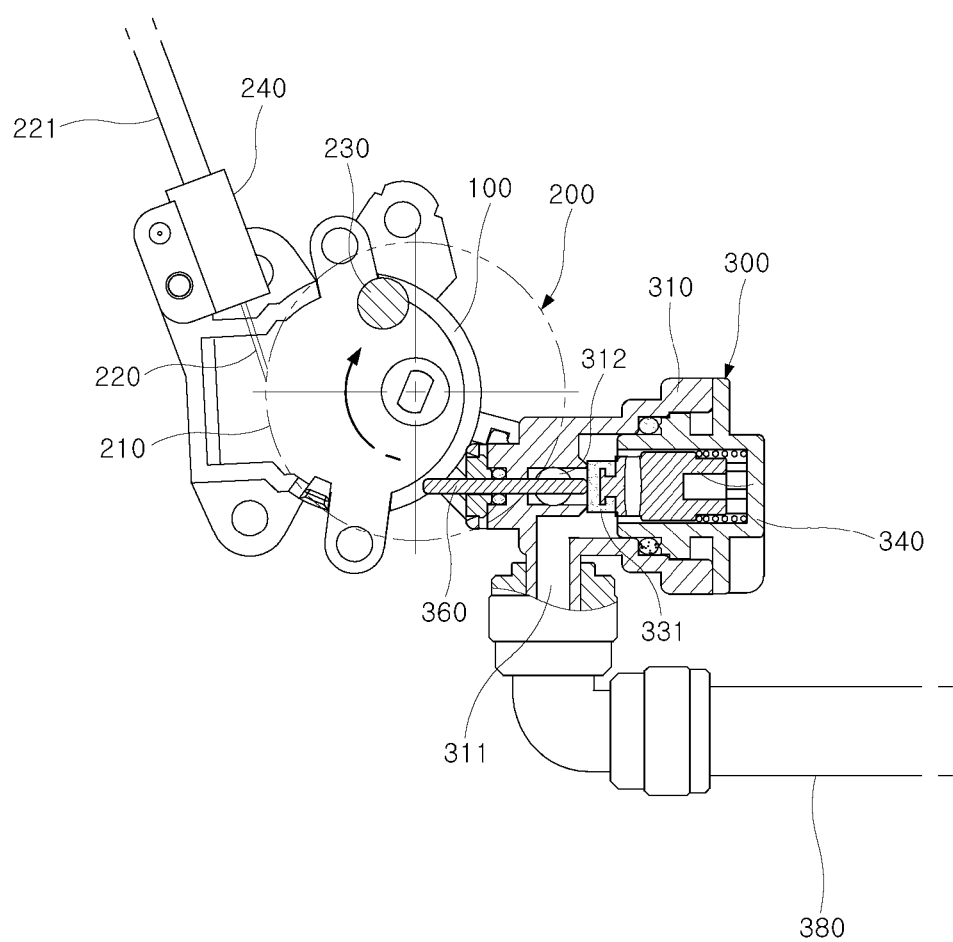

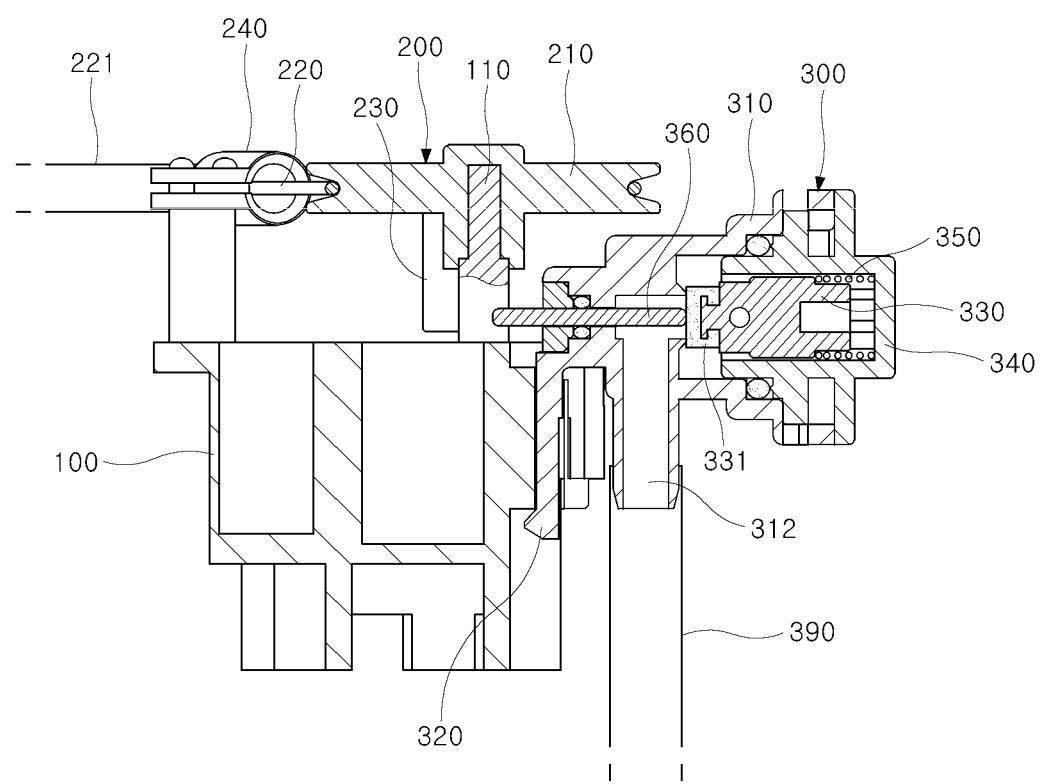
[FIG.16]

AUTOMATIC FLUSHING DEVICE FOR ELECTRONIC BIDET HAVING AUTOMATIC FLUSHING FUNCTION FOR BOTH WATER TANK AND DIRECT FLUSH VALVE TOILET

CROSS-REFERENCE TO RELATED APPLICATIONS

This application claims the benefit under 35 U.S.C. section 371, of PCT International Application No. PCT/KR2021/000097, filed on Jan. 6, 2021, which claims foreign priority to Korean Patent Application No. 10-2020-0003637, filed on Jan. 10, 2020, in the Korean Intellectual Property Office, both of which are hereby incorporated by reference in their entireties.

TECHNICAL FIELD

The present disclosure relates to an automatic flushing device for an electronic bidet, in which the automatic flushing device has an automatic flushing function and is for both a water tank toilet and a direct flush valve toilet. More particularly, in contrast to existing bidets, which are produced separately for the water tank toilet and the direct flush valve toilet in order to realize the automatic flushing function to the water tank toilet and the direct flush valve toilet, the automatic flushing device for the electronic bidet enables a single bidet to be capable of being used in both the water tank toilet and the direct flush valve toilet.

BACKGROUND ART

Generally, a toilet is mounted in a lavatory of a home or a building, and is configured such that urine and feces are discharged to a septic tank together with washing water that is drained by pressing a lever after a user uses the toilet.

However, recently, an automatic flushing bidet having a dual opening and closing valve and having a function of supplying water to the bidet by using water in a pressure chamber of a flush valve, in which the bidet is used in a direct flush valve toilet and is capable of detecting a user and washing out urine and feces according to a control of the bidet rather than a manual operation of a lever, has been registered in Korean Patent No. 10-1198901 (hereinafter, referred to as 'related art document 1').

In the related art document 1, after the user sitting on the bidet uses the toilet, a water passage is open by a motor that is rotated in a forward direction according to the control of a control unit and, at the same time, water in the pressure chamber of the flush valve is discharged to the toilet, thereby washing out urine and feces. Further, the water passage is closed by the motor that is rotated in a backward direction according to the control of the control unit, water is stored in the pressure chamber of the flush valve, and the motor waits for the next operation.

However, the related art document 1 has a problem in that the bidet in the related art document 1 can be mounted only in the direct flush valve toilet.

In addition, recently, a flush valve apparatus in which a bidet and an automatic flushing function of a toilet are capable of being selectively used has been registered in Korean Patent No. 10-1132763 (hereinafter, referred to as 'related art document 2').

In the related art document 2, after a user uses the toilet, the flush valve apparatus opens and closes a water passage by a solenoid valve according to a control of a control unit, and discharges water in a pressure chamber of a flush valve, thereby flushing out water in the toilet.

However, the related art document 2 has a problem in that the flush valve apparatus can be mounted only in a direct flush valve toilet. Further, although a water supplying hole of a piston of a conventional flush valve is enlarged in order to use the bidet and water is supplied to the bidet and also a flushing function is performed, there is a problem that a water hammer phenomenon occurs since the enlarged water supplying hole of the piston is directly closed when the solenoid valve is operated.

In order to solve the problems of the related art documents, recently, a method of controlling a bidet and a method of preventing a water hammer phenomenon have been registered in Korean Patent No. 10-1198900 (hereinafter, referred to as 'related art document 3'). In the related art document 3, the method of controlling the bidet uses a switching valve of the bidet and does not add a valve, and is capable of performing a washing operation and a bidet operation of the bidet by using washing water in a pressure chamber of a flush valve body in a direct flush valve toilet that is provided with the flush valve. Further, the method of controlling the bidet performs a washing operation of the toilet by automatically distinguishing urine and feces after a user uses the toilet. In addition, the method of preventing the water hammer phenomenon is capable of preventing the water hammer phenomenon after the washing operation of the toilet is performed.

However, in the related art document 3, water in the pressure chamber is primarily passing through a solenoid valve and is secondarily passing through a bidet hot water tank and then is tertiarily passing through a bidet washing switching valve, thereby performing an automatic flushing. Therefore, water is not capable of being flushed out directly, and also the methods in the related art document 3 can be applied only in a direct flush valve toilet. Further, in a low water pressure state, since water is flushed out in three stages, a pressure loss occurs due to loads that are separately applied to the water, so that there is a problem that a smooth flushing is not performed.

In addition, recently, a wire type automatic flushing system, which is related to an automatic flushing system of a water tank toilet, has been registered in Korean Patent No. 10-1190258 (hereinafter, referred to as 'related art document 4'). More particularly, in the related art document 4, a length of a wire is adjusted such that a siphon cover is not pulled to an upper portion of a drainage pipe of an overflow pipe. Further, after a user uses the toilet, the wire is wound by a rotation of a motor and the siphon cover is rotated upward around an axis of the overflow pipe, so that the drainage pipe is open. Furthermore, water stored in a tank is drained to the drainage pipe that is open, thereby washing out urine and feces.

However, the related art document 4 has a problem in that the system of the related art document 4 can be applied only in the water tank toilet.

As described above, products in the related art documents 1 to 4 are developed of a flushing apparatus and a control unit which are capable of being applied to only one toilet among a water tank toilet and a direct flush valve toilet, and are manufactured and managed as two products, so that there is a problem that cost is increased.

DISCLOSURE

Technical Problem

Accordingly, the present disclosure has been made keeping in mind the above problems occurring in the related art, and an objective of the present disclosure is to provide an automatic flushing device for an electronic bidet, in which the automatic flushing device has an automatic flushing function and is for both a water tank toilet and a direct flush valve toilet, the automatic flushing device being capable of being mounted in both the water tank toilet and the direct flush valve toilet.

In addition, another objective of the present disclosure is to provide an automatic flushing device for an electronic bidet, in which the automatic flushing device has an automatic flushing function and is for both a water tank toilet and a direct flush valve toilet, the automatic flushing device being capable of increasing reliability of a product by preventing a malfunction of a stepping motor since the stepping motor is mounted inside the electronic bidet.

In addition, still another objective of the present disclosure is to provide an automatic flushing device for an electronic bidet, in which the automatic flushing device has an automatic flushing function and is for both a water tank toilet and a direct flush valve toilet, the automatic flushing device having an increased work efficiency since a structure of lifting a water sealing cover is simplified, so that productivity is increased and manufacturing cost is reduced, thereby increasing product competitiveness.

In addition, yet another objective of the present disclosure is to provide an automatic flushing device for an electronic bidet, in which the automatic flushing device has an automatic flushing function and is for both a water tank toilet and a direct flush valve toilet, and in which the automatic flushing device does not use a method switching a switching valve so that water is passing through a conventional flush valve, a solenoid valve, and a hot water tank, the automatic flushing device being configured such that water is directly controlled at a pressure chamber of a flush valve by the automatic flushing device, thereby being capable of smoothly flushing out water.

Objectives of the present disclosure are not limited to the above-mentioned objectives. That is, other objectives that are not mentioned may be obviously understood by those skilled in the art to which the present disclosure pertains from the following description.

Technical Solution

Accordingly, the present disclosure has been made keeping in mind the above problems occurring in the related art, and an objective of the present disclosure is to provide an automatic flushing device for an electronic bidet, in which the automatic flushing device has an automatic flushing function and is for both a water tank toilet and a direct flush valve toilet.

The automatic flushing device includes: a stepping motor configured such that whether a user is in a sitting position or a standing up position is detected by a control unit of the electronic bidet and the stepping motor is rotated by a control signal set from the control unit; a roller portion for flushing mounted at a rotary shaft of the stepping motor, the roller portion for flushing being configured such that a roller is rotated by the control signal of the control unit and a wire is wound and unwound, thereby opening and closing a water sealing cover or pressing an opening and closing valve; and the opening and closing valve mounted at a casing of the stepping motor, the opening and closing valve being configured such that a flow path of a valve body is open by a rotation of a pressing member when the opening and closing valve is applied to the direct flush valve toilet, thereby discharging water in a pressure chamber of a flush valve to an inner portion of a toilet body and flushing out the water.

When the roller is rotated and then is returned, the stepping motor may be configured to slow down a rotational speed of the roller such that a water hammer phenomenon is prevented.

The roller portion for flushing may include: the roller fixed to the rotary shaft; the wire having a first side end fixed to the roller, the wire being configured to be wound and unwound while being guided by a tube that surrounds an outside of the wire; and the pressing member which protrudes downward on the roller and which is configured to press an opening and closing pin of the opening and closing valve.

The automatic flushing device may further include a tube fixture which is fixed to an upper portion of the stepping motor and which fixes the tube.

The opening and closing valve may include: the valve body having an inlet port and an outlet port that are in communication with each other; a fixing hook coupled to a fixing guide space that is formed on the stepping motor, thereby fixing the valve body to the stepping motor; a flush rod coupled to an inner portion of the valve body, the flush rod being configured such that a rod packing is mounted at an end portion of the flush rod so that the outlet port is open and closed by a pressing operation of an opening and closing pin; a valve cover which accommodates the flush rod and which is closely fixed to a rear end portion of the valve body; a spring mounted between the flush rod and the valve cover; the opening and closing pin mounted on an end portion of the valve body such that the opening and closing pin is capable of being slid, the opening and closing pin being configured to apply or release a pressure to the flush rod; a guide cover which is closely fixed to the end portion of the valve body and which guides the opening and closing pin; a water supplying hose connected to the inlet port; and a water discharging hose connected to the outlet port.

Preferably, the valve cover and the guide cover may be fixed to the valve body by being coupled in a rotational coupling manner.

Advantageous Effects

The present disclosure is capable of being applied to both two types of toilets that are a water tank toilet and a direct flush valve toilet. Therefore, when the automatic flushing device of the present disclosure is manufactured, only one product can be manufactured, so that economic feasibility may be increased since productivity is increased and manufacturing cost is reduced. In addition, since the two types do not required to be distinguished when the automatic flushing device of the present disclosure is manufactured, there is an effect that economic feasibility may be additionally increased due to the simplification of product management.

In addition, the present disclosure is capable of being smoothly operated regardless of a low water pressure state or a high water pressure state, and also there is an effect that economic feasibility is increased since consumption of electricity may be reduced.

In addition, in the present disclosure, in a situation in which the direct flush valve toilet is mounted, when a washing operation and a bidet operation are performed, an amount of washing water less than the amount of washing water flowing into the pressure chamber of the flush valve body is used, so that a piston of the flush valve is not operated. Further, when the user uses the toilet, an amount of washing water more than the amount of washing water flowing into the pressure chamber is automatically discharged.

Therefore, only one pipe is required to connect the flush valve body to the electronic bidet, so that entire main valve of the toilet is not required to be locked and the present disclosure is capable of being mounted when only a middle valve of a separate existing flush valve is locked. Therefore, there is an effect that a mounting work is very easily performed on the direct flush valve toilet.

In addition, since the present disclosure does not use the method switching a switching valve so that water is passing through a conventional flush valve, a solenoid valve, and a hot water tank, water is directly controlled at the pressure chamber of the flush valve by the automatic flushing device, so that there is an effect that the flushing is smoothly performed.

In addition, in the present disclosure, since the stepping motor is mounted inside the electronic bidet, malfunction may be prevented and electric shock accident may be reduced, so that there is an effect that the present disclosure may be safely used.

In addition, in the present disclosure, work efficiency is increased since a structure of lifting the water sealing cover is simplified, and productivity is increased and manufacturing cost is reduced, so that there is an effect that product competitiveness may be increased.

DESCRIPTION OF DRAWINGS

FIG. 1 is a perspective view illustrating a state in which the present disclosure is mounted in an electronic bidet.

FIG. 2 is an exploded perspective view illustrating the present disclosure.

FIG. 3 is an exploded perspective view illustrating an opening and closing valve of the present disclosure.

FIG. 4 is a plan view illustrating a configuration of the present disclosure.

FIG. 5 is a front view illustrating the configuration of the present disclosure.

FIG. 6 is a view illustrating a state in which the present disclosure is applied to a water tank toilet.

FIG. 7 is a view illustrating a state in which the present disclosure is applied to a direct flush valve toilet.

FIGS. 8 and 9 are views illustrating an operation state in which a water sealing cover is rotated upward and a drainage pipe is open according to the present disclosure.

FIGS. 10 and 11 are views illustrating an operation state in which the water sealing cover is rotated downward and the drainage pipe is closed according to the present disclosure.

FIGS. 12 to 14 are views illustrating an operation state in which water in a pressure chamber of a flush valve is discharged to a toilet body and is flushed out according to the present disclosure.

FIGS. 15 and 16 are views illustrating an operation state in which the pressure chamber of the flush valve is closed according to the present disclosure.

BEST MODE

Hereinafter, an embodiment of the present disclosure will be described in detail with reference to the accompanying drawings.

FIG. 1 is a perspective view illustrating a state in which the present disclosure is mounted in an electronic bidet, and FIG. 2 is an exploded perspective view illustrating the present disclosure.

According to the present disclosure, an automatic flushing device for an electronic bidet, in which the automatic flushing device has an automatic flushing function and is for both a water tank toilet and a direct flush valve toilet, includes a stepping motor 100, a roller portion 200 for flushing, and an opening and closing valve 300. Further, the automatic flushing device is mounted inside the electronic bidet.

The stepping motor 100, the roller portion 200 for flushing, and the opening and closing valve 300 are not individually separated, but are integrally manufactured, and are configured such that the stepping motor 100, the roller portion 200 for flushing, and the opening and closing valve 300 are capable of being used in both the water tank toilet and the direct flush valve toilet, without distinction.

The stepping motor 100 has an outer portion provided with a casing so that the stepping motor 100 is fixed to an inner portion of the electronic bidet 1, and the casing has a structure in which a motor is mounted inside the casing. Further, the stepping motor 100 is driven by a control signal detected through a control unit (not illustrated) provided at the electronic bidet 1.

When the roller portion 200 for flushing is rotated for performing a flushing function, the stepping motor 100 is controlled by the control unit such that the stepping motor 100 is rotated in a constant speed. Further, when the roller portion 200 for flushing is returned, the stepping motor 100 is controlled by the control unit such that the stepping motor 100 is rotated slower than a speed of the stepping motor at the time when the roller portion 200 for flushing is rotated for performing the flushing function.

In addition, the roller portion 200 for flushing is coupled to a rotary shaft 110 of the stepping motor 100, and is configured to be rotated, thereby opening and closing a water sealing cover of the water tank toilet.

The roller portion 200 for flushing includes a roller 210, a wire 220, and a pressing member 230. Further, the roller 210 is coupled to the rotary shaft 110 and fixes a first side end portion of the wire 220, thereby being configured to wound or unwound the wire 220.

In a state in which the wire 220 is applied to the water tank toilet, the first side end portion of the wire 220 is fixed to the roller 210 and a second side end portion of the wire 220 is connected to the water sealing cover 30 provided inside a water tank 20. Further, in a state in which the wire 220 is applied to the direct flush valve toilet, since the wire 220 does not have a function performed in the direct flush valve toilet, the end portions of the wire 220 may be cut or may remain such that the end portions of the wire 220 are positioned inside the electronic bidet.

The pressing member 230 protrudes downward on a lower surface of the roller 210, and serves to press an opening and closing pin 360 of the opening and closing valve 300.

Here, a tube 221 is provided outside the wire 220 so as to surround and protect the wire 220 and also to guide a movement of the wire 220 when the roller 210 is rotated and returned. Further, the tube 221 may be fixed to a tube fixture 240 that is fixed to an upper portion of the casing of the stepping motor 100.

In addition, the opening and closing valve 300 is mounted at the casing of the stepping motor 100. Further, when the opening and closing valve 300 is applied to the direct flush valve toilet, the opening and closing valve 300 is configured to open a flow path of an inlet port 311 and an outlet port 312 of a valve body 310, and is configured to discharge water stored in a pressure chamber of a flush valve to an inner portion of a toilet body 10, thereby flushing out water.

The valve body 310 of the opening and closing valve 300 has an inner center portion which is penetrated, and the inlet port 311 is formed at a first side of the valve body 310 and the outlet port 312 is formed at a lower portion of the valve body 310, so that the inlet port 311 and the outlet port 312 are in communication with each other.

A first side end portion of a water supplying hose 380 is connected to the inlet port 311, and a second side end portion of the water supplying hose 380 is connected to the pressure chamber 50 of the flush valve 40.

A first side end portion of a water discharging hose 390 is connected to the outlet port 312, and a second side end portion of the water discharging hose 390 is connected to the inner portion of the toilet body 10.

A fixing hook 320 is formed at the lower portion of the valve body 310, and the fixing hook 320 is coupled to a fixing guide space 321 formed at the casing of the stepping motor 100, thereby fixing the valve body 310.

A flush rod 330 having an end portion on which a rod packing 331 is mounted is coupled to an inner portion of the valve body 310, and is configured to open and close the outlet port 312 according to whether or not the opening and closing pin 360 is pressed, the outlet port 312 being formed at the valve body 310.

A valve cover 340 is fixed to a rear end portion of the valve body 310, and the valve cover 340 prevents the flush rod 330 from separating and guides the flush rod 330 so that the flush rod 330 is smoothly slid.

A spring 350 is mounted between the flush rod 330 and the valve body 340, thereby applying an elastic force to the flush rod 330.

The opening and closing pin 360 is mounted on an end portion of the valve body 310 such that the opening and closing pin 360 is capable of being slid. Further, the opening and closing pin 360 presses the rod packing 331 of the flush rod 330 by a pressure of the pressing member 230 of the roller portion 200 for flushing, and is returned by a returning force of the spring 350 when the pressure is released.

A guide cover 370 is fixed to the end portion of the valve body 310, and the guide cover 370 prevents water leakage and also guides a movement of the opening and closing pin 360.

Here, protrusions are formed on outer circumferential surfaces of the valve cover 340 and the guide cover 370, and groove portions are formed on the valve body 310, so that the valve cover 340 and the guide cover 370 are coupled to the valve body 310 in a rotational coupling manner and are capable of being closely fixed to the valve body 310.

As described above, the present disclosure may be applied to both the water tank toilet and the direct flush valve toilet. First, an operation process of the present disclosure that is applied to the water tank toilet will be described in detail.

As illustrated in FIGS. 8 and 9, when a user is separated from the electronic bidet 1 after the user uses the toilet, the control unit senses whether or not the user is separated from the toilet. Then, according to a detection signal, the control unit applies power and drives the stepping motor 100.

When the stepping motor 100 is rotated, the roller 210 of the roller portion 200 for flushing is rotated in a forward direction at the same time.

At this time, the wire 220 is wound on the roller 210 and, at the same time, the water sealing cover 30 connected to the wire 220 is rotated upward around an axis and opens a drainage pipe, and water stored in the water tank 20 is drained to the toilet body 10, thereby performing the flushing.

As illustrated in FIGS. 10 and 11, when the flushing is completed, the stepping motor 100 is rotated in a backward direction by a control of the control unit and, at the same time, the roller 210 is rotated in the backward direction and unwounds the wire 220. Further, the water sealing cover 30 in which a supporting force is released when the wire 220 is unwound is rotated downward around the axis and closes the drainage pipe, and waits for the next operation.

In addition, an operation process of the present disclosure that is applied to the direct flush valve toilet will be described in detail.

As illustrated in FIGS. 12 to 14, when a user is separated from the electronic bidet 1 after the user uses the toilet, when a user uses the toilet, the control unit senses whether or not the user is separated from the toilet. Then, according to a detection signal, the control unit applies power and drives the stepping motor 100.

When the stepping motor 100 is rotated, the roller 210 of the roller portion 200 for flushing is rotated in the forward direction at the same time.

At this time, the pressing member 230 that protrudes on the lower portion of the roller 210 presses the end portion of the opening and closing pin 360 of the opening and closing valve 300.

The rear end portion of the opening and closing pin 360 presses the rod packing 331 of the flush rod 330. Therefore, the flush rod 330 compresses the spring 350 by moving inside the valve cover 340 and, at the same time, opens the outlet port 312.

When the outlet port is open, pressure in the pressure chamber 50 of the flush valve 40 is released, and water in the pressure chamber 50 is introduced into the inlet port 311 through the water supplying hose 380.

Water that has introduced into the inlet port 311 is discharged to the outlet port 312, and the water is discharged to the inner portion of the toilet body 10 along the water discharging hose 390, so that the flushing is performed.

As illustrated in FIGS. 15 and 16, when the flushing is completed, the stepping motor 100 is returned by being rotated in the backward direction by the control of the control unit and, at the same time, the pressing member 230 is separated from the opening and closing pin 360. At this time, the stepping motor 100 is rotated at a speed that is slower than a speed at the time when the stepping motor 100 is rotated for performing the flushing, so that a water hammer phenomenon may be prevented.

When the pressure applied to the opening and closing pin 360 is released, the flush rod 330 is moved by the returning force of the spring 350 and closes the outlet port 312. At the same time, the flush valve 40 is closed and the flush rod 330 waits for the next operation.

While the present disclosure has been particularly described with reference to exemplary embodiments shown in the drawings, terms or words used in the specification and claims should be interpreted as meanings and concepts consistent with the technical idea of the present disclosure without being limited to common or dictionary meanings.

Accordingly, since embodiments described in the specification and shown in the drawings are intended not to limit the technical idea of the disclosure, it will be understood by those of ordinary skill in the art that various changes and modifications may be made without departing from the spirit and scope of the present disclosure as defined by the appended claims.

The invention claimed is:

1. An automatic flushing device for an electronic bidet, in which the automatic flushing device has an automatic flushing function and is for both a water tank toilet and a direct flush valve toilet, the automatic flushing device comprising:
a stepping motor configured such that whether a user is in a sitting position or a standing up position is detected by a control unit of the electronic bidet and the stepping motor is rotated by a control signal set from the control unit;
    a roller portion for flushing mounted at a rotary shaft of the stepping motor, the roller portion for flushing being configured such that a roller is rotated by the control signal of the control unit and a wire is wound and unwound, thereby opening and closing a water sealing cover or pressing an opening and closing valve; and
    the opening and closing valve mounted at a casing of the stepping motor, the opening and closing valve being configured such that a flow path of a valve body is open by a rotation of a pressing member when the opening and closing valve is applied to the direct flush valve toilet, thereby discharging water in a pressure chamber of a flush valve to an inner portion of a toilet body and flushing out the water.

2. An automatic flushing device for an electronic bidet, in which the automatic flushing device has an automatic flushing function and is for both a water tank toilet and a direct flush valve toilet, the automatic flushing device comprising:
a stepping motor configured such that whether a user is in a sitting position or a standing up position is detected by a control unit of the electronic bidet and the stepping motor is rotated by a control signal set from the control unit;
    a roller portion for flushing mounted at a rotary shaft of the stepping motor, the roller portion for flushing being configured such that a roller is rotated by the control signal of the control unit and a wire is wound and unwound, thereby opening and closing a water sealing cover or pressing an opening and closing valve; and
    the opening and closing valve mounted at a casing of the stepping motor, the opening and closing valve being configured such that a flow path of a valve body is open by a rotation of a pressing member when the opening and closing valve is applied to the direct flush valve toilet, thereby discharging water in a pressure chamber of a flush valve to an inner portion of a toilet body and flushing out the water,
    wherein, when the roller is rotated and then is returned, the stepping motor is configured to slow down a rotational speed of the roller such that the opening and closing valve is slowly closed, thereby preventing water in the pressure chamber from generating a water hammer phenomenon.

3. The automatic flushing device of claim 2, wherein the roller portion for flushing comprises:
    the roller fixed to the rotary shaft;
    the wire having a first side end fixed to the roller, the wire being configured to be wound and unwound while being guided by a tube that surrounds an outside of the wire; and
    the pressing member which protrudes downward on the roller and which is configured to press an opening and closing pin of the opening and closing valve.

4. The automatic flushing device of claim 3, further comprising a tube fixture which is fixed to an upper portion of the stepping motor and which fixes the tube.

5. The automatic flushing device of claim 2, wherein the opening and closing valve comprises:
    the valve body having an inlet port and an outlet port that are in communication with each other;
    a fixing hook coupled to a fixing guide space that is formed on the stepping motor, thereby fixing the valve body to the stepping motor; a flush rod coupled to an inner portion of the valve body, the flush rod being configured such that a rod packing is mounted at an end portion of the flush rod so that the outlet port is open and closed by a pressing operation of an opening and closing pin;
    a valve cover which accommodates the flush rod and which is closely fixed to a rear end portion of the valve body;
    a spring mounted between the flush rod and the valve cover;
    the opening and closing pin mounted on an end portion of the valve body such that the opening and closing pin is capable of being slid, the opening and closing pin being configured to apply or release a pressure to the flush rod;
    a guide cover which is closely fixed to the end portion of the valve body and which guides the opening and closing pin;
    a water supplying hose connected to the inlet port; and
    a water discharging hose connected to the outlet port.

6. The automatic flushing device of claim 5, wherein the valve cover and the guide cover are fixed to the valve body by being coupled in a rotational coupling manner.

* * * * *